(12) United States Patent
Yang (10) Patent No.: US 10,234,054 B1
(45) Date of Patent: Mar. 19, 2019

(54) LABOR-SAVING PUSH-BUTTON WATER VALVE (71) Applicant: PURITY (XIAMEN) SANITARY WARE CO., LTD., Xiamen (CN)

(72) Inventor: Xiwen Yang, Xiamen (CN)

(73) Assignee: PURITY (XIAMEN) SANITARY WARE CO., LTD., Xiamen, Fujian (CN)

(*) Notice: Subject to any disclaimer, the term of this patent is extended or adjusted under 35 U.S.C. 154(b) by 0 days.

(21) Appl. No.: 15/869,108

(22) Filed: Jan. 12, 2018

(51) Int. Cl.
F16K 31/60 (2006.01)
F16K 21/02 (2006.01)
B05B 1/16 (2006.01)
F16K 21/12 (2006.01)
B05B 1/30 (2006.01)
B05B 1/18 (2006.01)

(52) U.S. Cl.
CPC .......... F16K 31/602 (2013.01); B05B 1/1663 (2013.01); B05B 1/30 (2013.01); F16K 21/02 (2013.01); F16K 21/12 (2013.01); B05B 1/18 (2013.01)

(58) Field of Classification Search
CPC ........ F16K 31/602; F16K 21/12; F16K 21/02; B05B 1/1663; B05B 1/18; B05B 1/30
USPC ......... 251/321, 282; 239/154, 574, 443–449, 239/525; 4/675–678
See application file for complete search history.

(56) References Cited

U.S. PATENT DOCUMENTS

| | | | | |
|---|---|---|---|---|
| 3,042,312 A * | 7/1962 | Packard | ............... | A01C 23/042 239/315 |
| 4,156,519 A * | 5/1979 | Janz | ........................ | F16K 1/526 137/454.6 |
| 4,191,332 A * | 3/1980 | De Langis | ............ | B05B 1/3026 239/428.5 |
| 5,123,628 A * | 6/1992 | Yu | ........................... | E03C 1/021 138/42 |
| 5,303,735 A * | 4/1994 | Cerola | ................ | A61M 13/003 137/596.2 |
| 5,653,260 A * | 8/1997 | Huber | ..................... | E03C 1/021 137/625.33 |
| 6,738,996 B1 * | 5/2004 | Malek | ................... | B05B 1/1618 239/441 |
| 7,909,269 B2 * | 3/2011 | Erickson | ............... | B05B 1/1618 137/801 |
| 9,272,295 B2 * | 3/2016 | Esche | ................... | B05B 1/1618 |
| 2013/0092752 A1 * | 4/2013 | Schumacher | ............ | B05B 1/30 239/154 |

* cited by examiner

Primary Examiner — John Bastianelli
(74) Attorney, Agent, or Firm — Leong C. Lei (57) ABSTRACT

A labor-saving push-button water valve includes a button, a valve core, a valve core spring, and a valve seat. The middle portion of the valve seat is formed with a core chamber. An outer periphery of a front end of the valve core is formed with an annular groove. When the button drives the valve core to move to the position where a water inlet hole is not communicated with a water outlet hole, an annular hydraulic chamber is formed between the valve core and the peripheral wall of the core chamber. The water valve is able to switch the opening and closing of the waterway smoothly by reducing the water pressure applied to the valve core, and reduces the wear of the valve core, and improves the service life and the airtightness of the water saving structure.

8 Claims, 10 Drawing Sheets

LABOR-SAVING PUSH-BUTTON WATER VALVE

BACKGROUND OF THE INVENTION

1. Field of the Invention

The present invention relates to a bathroom accessory, and more particularly to a labor-saving push-button water valve.

2. Description of the Prior Art

Figure 1:
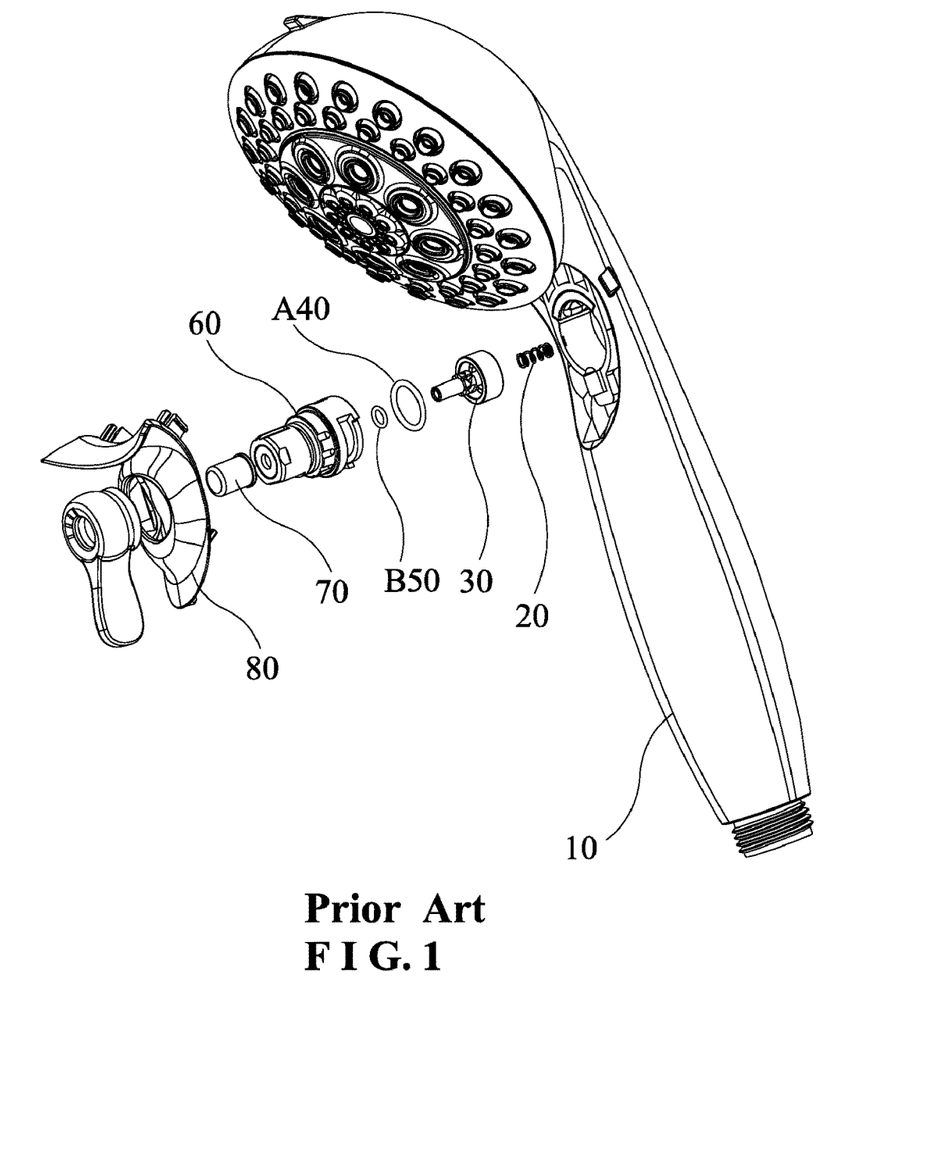
FIG. 1 is an exploded view of a conventional push-button water saving structure.
Figure 2:
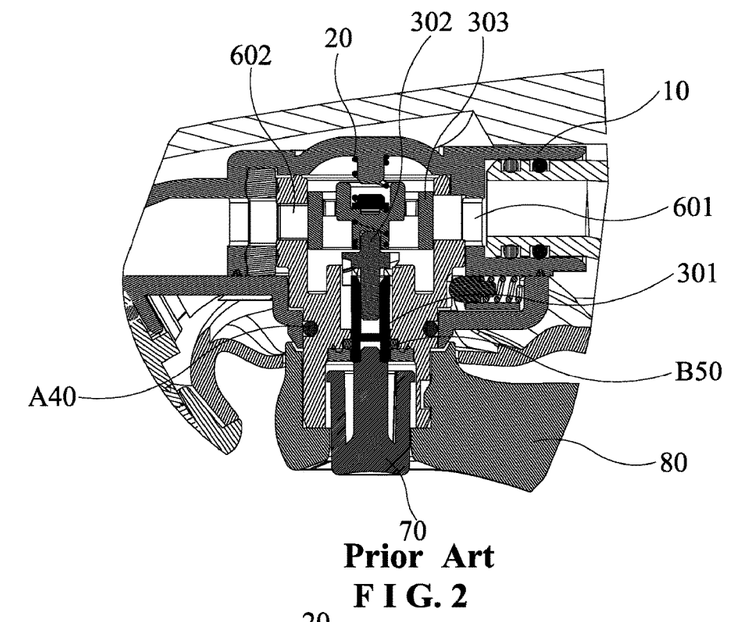
FIG. 2 is a cross-sectional view of the conventional push-button water saving structure in a water saving state.
Figure 3:
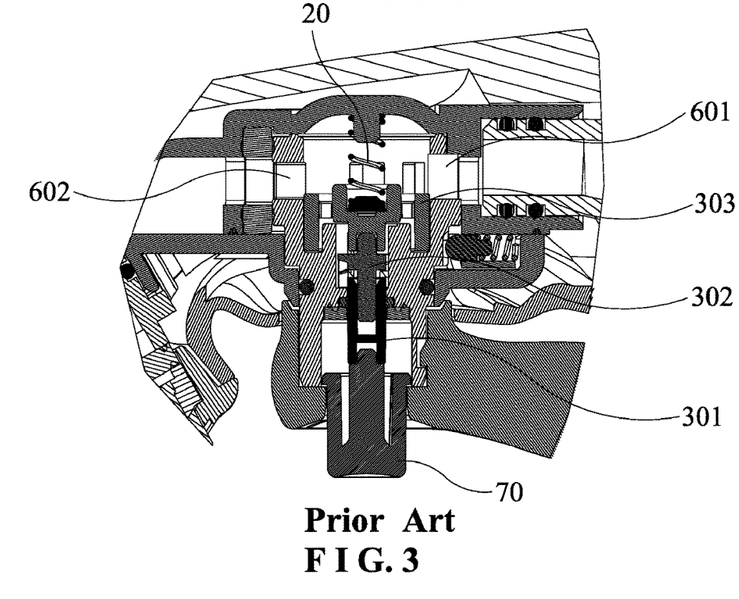
FIG. 3 is a cross-sectional view of the conventional push-button water saving structure not in a water saving state.

As shown in FIG. 1 to FIG. 3, a conventional push-button water saving structure in the bathroom industry comprises a water inlet assembly 10, a spring 20, a valve core assembly 30, an O-shaped ring 40, an O-shaped ring 50, a fixing seat 60, a button 70, and a decorative cover 80. The valve core assembly 30 includes a first intermediate member 301, a second intermediate member 302, and a valve core 303. The fixing seat 60 is inserted into a water inlet passage of the water inlet assembly 10 from the side of the water inlet assembly. The valve core 303 is movably disposed in the fixing seat 60 and can be moved along the axial direction. Two sides of the fixing seat 60 are formed with a water inlet hole 601 corresponding to a water inlet end of the water inlet assembly 10 and a water outlet hole 602 corresponding to a water outlet end of the water inlet assembly 10, respectively. The spring 20 is sleeved on the valve core 302. As shown in FIG. 2 and FIG. 3, when the button 70 is pressed to move the valve core 303 axially in the fixing seat 60 to block the water inlet hole 601. When the button 70 is released, the spring 20 reversely pushes the valve core 302 to move axially to open the water inlet hole 601, thereby achieving the purpose of closing the waterway when water saving is needed and opening the waterway of the water inlet assembly 10 when water is needed. The conventional push-button water saving structure is able to save water.

The disadvantage of the aforesaid push-button water saving structure is described below. The valve core 303 blocks the water through close contact with the water inlet hole 601. When the waterway is disconnected, the valve core 302 is pressed to the position blocking the water inlet hole 601, and the valve core 302 is subjected to the water pressure in the direction of the water inlet hole so that the valve core 303 is tightly in contact with the inner wall of the water outlet hole 602 of the fixing seat 60. When the button 70 is released, the valve core 303 is pushed to move backward by the elastic restoring force of the spring 20. The friction of the axial movement of the valve core 303 against the inner wall of the fixing seat 60 is larger. The spring 20 needs to provide a larger force to return the valve core 303 to the initial position, so the operation of opening and closing the waterway is not smooth. In the case of large water pressure, the elastic restoring force of the spring is less than the friction, the valve core 303 cannot return to its initial position so that the waterway cannot be opened. The valve core 302 and the fixing seat 60 will be worn due to frequent friction, resulting in that the service life of the valve core and the airtightness of the waterway are reduced. As a result, the water flows out along the gap.

Accordingly, the inventor of the present invention has devoted himself based on his many years of practical experiences to solve these problems.

SUMMARY OF THE INVENTION

The primary object of the present invention is to provide a labor-saving push-button water valve which is able to switch the opening and closing of the waterway smoothly by reducing the water pressure applied to a valve core, and reduces the wear of the valve core, and improves the service life and the airtightness of the water saving structure.

In order to achieve the aforesaid object, the labor-saving push-button water valve of the present invention comprises a button, a valve core, a valve core spring, and a valve seat. A middle portion of the valve seat is formed with a core chamber. A peripheral wall of the core chamber is provided with a water inlet hole and a water outlet hole. The valve core is movably inserted in the core chamber to be moved back and forth. A front end of the valve core leans against the valve core spring. A rear end of the valve core is connected to the button. The valve core is driven by the button and the elasticity of the valve core spring to move back and forth in the core chamber so that the water inlet hole is communicated with the water outlet hole to open the water valve or the water inlet hole is not communicated with the water outlet hole to close the water valve. An outer periphery of the front end of the valve core is formed with an annular groove. When the button drives the valve core to move to the position where the water inlet hole is not communicated with the water outlet hole, the annular groove of the valve core is communicated with the water inlet hole, and an annular hydraulic chamber is formed between the valve core and the peripheral wall of the core chamber.

Preferably, the water inlet hole and the water outlet hole of the peripheral wall of the core chamber are staggered with each other.

Preferably, the valve seat is formed on a side wall of a water inlet assembly. The water inlet assembly is formed with a water inlet passage in the water inlet assembly. The core chamber is divided into a front section and a rear section to communicate with each other. The front section is a water chamber extending from the side wall of the water inlet assembly to the water inlet passage. The rear section is a drive chamber extending to an outside of the water inlet assembly. The valve core is movably inserted in the water chamber and the drive chamber to be moved back and forth. The front end of the valve core is moved back and forth in the water chamber for the water inlet hole and the water outlet hole to be connected or disconnected. The rear end of the valve core is moved back and forth in the drive chamber. A gasket is provided between the water chamber and the drive chamber. The gasket is sleeved on the valve core. A peripheral wall of the water chamber is formed with the water inlet hole and the water outlet hole. The water inlet hole is communicated with a water inlet end of the water inlet passage. The water outlet hole is communicated with a water outlet end of the water inlet passage.

The push-button water valve further comprises a fixing seat, a connecting shaft, and a connecting shaft sleeve. The fixing seat is disposed in the drive chamber. The fixing seat is provided with a through hole. The rear end of the valve core is movably inserted in through hole. The rear end of the valve core is connected to a front end of the connecting shaft which is movably disposed in the through hole of the fixing seat. A rear end of the connecting shaft is connected to a front end of the connecting shaft sleeve which is movably disposed in the through hole of the fixing seat. Two sides of the valve seat are formed with slide grooves, respectively. Return springs are provided in the slide grooves, respectively. Two sides of the button are movably disposed in the slide grooves to be moved axially in the slide grooves. When the button is moved axially, a central portion of the button is fitted on a rear end of the connecting shaft sleeve to push the connecting shaft sleeve, the connecting shaft and the valve core to move axially simultaneously.

Preferably, an inner wall of the water inlet assembly is formed with a fixing groove. A front end of the valve core spring is fixed in the fixing groove.

Preferably, the labor-saving push-button water valve further comprises a decorative cover buckled on a side of the water inlet assembly. The decorative cover is configured to retain the button so that the button won't disengage from the slide grooves.

Preferably, the labor-saving push-button water valve further comprises a retainer. An inner wall of the drive chamber is formed with an engaging groove. A bottom of the retainer extends laterally to form an engaging ring. The engaging ring is engaged in the engaging groove. The top of the retainer is sleeved on an upper end of the fixing seat so that the fixing seat won't disengage from the drive chamber.

Preferably, the labor-saving push-button water valve further comprises a first O-shaped sealing ring and a second O-shaped sealing ring. The first O-shaped sealing ring is disposed between the fixing seat and the drive chamber. The second O-shaped sealing ring is disposed between the connecting shaft sleeve and the fixing seat.

Preferably, the valve core is formed with a positioning hole in an axial direction. A rear end of the valve core spring is inserted and engaged in the positioning hole.

Preferably, the water inlet assembly is a water inlet pipe.

According to the aforesaid technical scheme, the working principle of the present invention is as follows:

When the button is pressed down, the button pushes the valve core to move forward in the core chamber and the valve core spring is compressed. The water inlet hole and the water outlet hole of the peripheral wall of the core chamber are not communicated with each other. The water at one end of the water inlet hole cannot reach the water outlet hole through the water chamber. At this moment, the annular groove of the valve core is communicated with the water inlet hole so that the water from the water inlet hole to the valve core is to fill the annular groove. The annular groove forms the annular hydraulic chamber. The water in the annular hydraulic chamber applies a force towards the axial center of the valve core in a 360-degree manner so that there is no pressure difference in all directions of the valve core. After the button is released, the restoring force of the valve core spring pushes the valve core to move backwards. The friction between the valve core and the peripheral wall of the core chamber is greatly reduced, so that the valve core can be quickly rebounded after the button is released.

The beneficial effect of the present invention is that the valve core is no longer subjected to the pressure difference caused by the water flow through the design of the annular groove of the valve core so that the valve core can be axially returned more smoothly, without using the core valve spring having larger elasticity. In addition, the friction is reduced to prevent the valve core and the core chamber from being worn. The airtightness of the water saving structure is improved.

DETAILED DESCRIPTION OF THE PREFERRED EMBODIMENTS

Embodiments of the present invention will now be described, by way of example only, with reference to the accompanying drawings.

As shown in FIG. 4 to FIG. 14, the present invention discloses a labor-saving push-button water valve comprising a valve core 2, a button 3, a valve core spring 7, and a valve seat 15. Wherein, the valve seat 15 is formed on a side wall of a water inlet assembly 1. The water inlet assembly 1 is formed with a water inlet passage 11 in the water inlet assembly 1. In this embodiment, the water inlet assembly 1 is a water inlet pipe. The middle portion of the valve seat 15 is formed with a core chamber 14. The core chamber 14 is divided into a front section and a rear section to communicate with each other. The front section is a water chamber 141 extending from the side wall of the water inlet assembly 1 to the water inlet passage 11. The rear section is a drive chamber 142 extending to the outside of the water inlet assembly 1. The valve core 2 is movably inserted in the water chamber 141 and the drive chamber 142 and can be moved back and forth. The peripheral wall of the water chamber 141 of the core chamber 14 is provided with a water inlet hole 12 and a water outlet hole 13. The water inlet hole 12 is communicated with a water inlet end of the water inlet passage 11. The water outlet hole 13 is communicated with a water outlet end of the water inlet passage 11. A front end of the valve core 2 is movably inserted in the water chamber 141, and is in contact with the valve core spring 7. The valve core 2 is driven by the button 3 and the elasticity of the valve core spring 7 to move back and forth in the water chamber 141 and the drive chamber 142, so that the water inlet hole 12 is communicated with the water outlet hole 13 to open the water valve, or the water inlet hole 12 is not communicated with the water outlet hole 13 to close the water valve. A gasket 26 is provided between the water chamber 141 and the drive chamber 142, and the gasket 26 is sleeved on the valve core 2.

The outer periphery of the front end of the valve core 2 is formed with an annular groove 21. When the button 3 drives the valve core 2 to move to the position where the water inlet hole 12 and the water outlet hole 13 are not communicated with each other, the annular groove 21 of the valve core 2 is communicated with the water inlet hole 12. An annular hydraulic chamber is formed between the valve core 2 and the peripheral wall of the core chamber 14.

In order to simplify the structure, the water inlet hole 12 and the water outlet hole 13 are staggered with each other.

Furthermore, the push-button water valve further comprises a fixing seat 4, a connecting shaft 5, and a connecting shaft sleeve 6. Wherein, the fixing seat 4 is disposed in the drive chamber 142. The fixing seat 4 is provided with a through hole 41. A rear end of the valve core 2 is movably inserted in through hole 41. The rear end of the valve core 2 is connected to a front end of the connecting shaft 5 which is movably disposed in the through hole 41 of the fixing seat 4. A rear end of the connecting shaft 5 is connected to a front end of the connecting shaft sleeve 6 which is movably disposed in the through hole 41 of the fixing seat 4. Two sides of the valve seat 15 are formed with slide grooves 17, respectively. Return springs 23 are provided in the slide grooves 17, respectively. Two sides of the button 3 are movably disposed in the slide grooves 17 and can be moved axially in the slide grooves 17. When the button 3 is moved axially, the central portion of the button 3 is fitted on a rear end of the connecting shaft sleeve 6 to push the connecting shaft sleeve 6, the connecting shaft 5 and the valve core 2 to move axially simultaneously.

As a preferred embodiment, the inner wall of the water inlet assembly 1 is formed with a fixing groove 16. A front end of the valve core spring 7 is fixed in the fixing groove 16, thereby preventing the valve core spring 7 from moving in the water chamber 141.

As a preferred embodiment, the push-button water valve further comprises a decorative cover 8 buckled on the side of the water inlet assembly 1. The decorative cover 8 is configured to retain the button 3 so that the button 3 won't disengage from the slide grooves 17.

As a preferred embodiment, the push-button water valve further comprises a retainer 61. The inner wall of the drive chamber 142 is formed with an engaging groove 18. The bottom of the retainer 61 extends laterally to form an engaging ring 62. The engaging ring 62 is engaged in the engaging groove 18. The top of the retainer 61 is sleeved on an upper end of the fixing seat 4 so that the fixing seat 4 won't disengage from the drive chamber 142. In order to further improve the stability of the axial movement of the valve core 2, the valve core 2 is formed with a positioning hole 22 in an axial direction. A rear end of the valve core spring 7 is inserted and engaged in the positioning hole 22.

Figure 13:
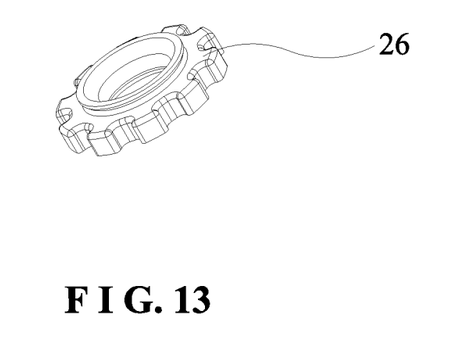
FIG. 13 is a structural schematic view of the gasket of the present invention.
Figure 14:
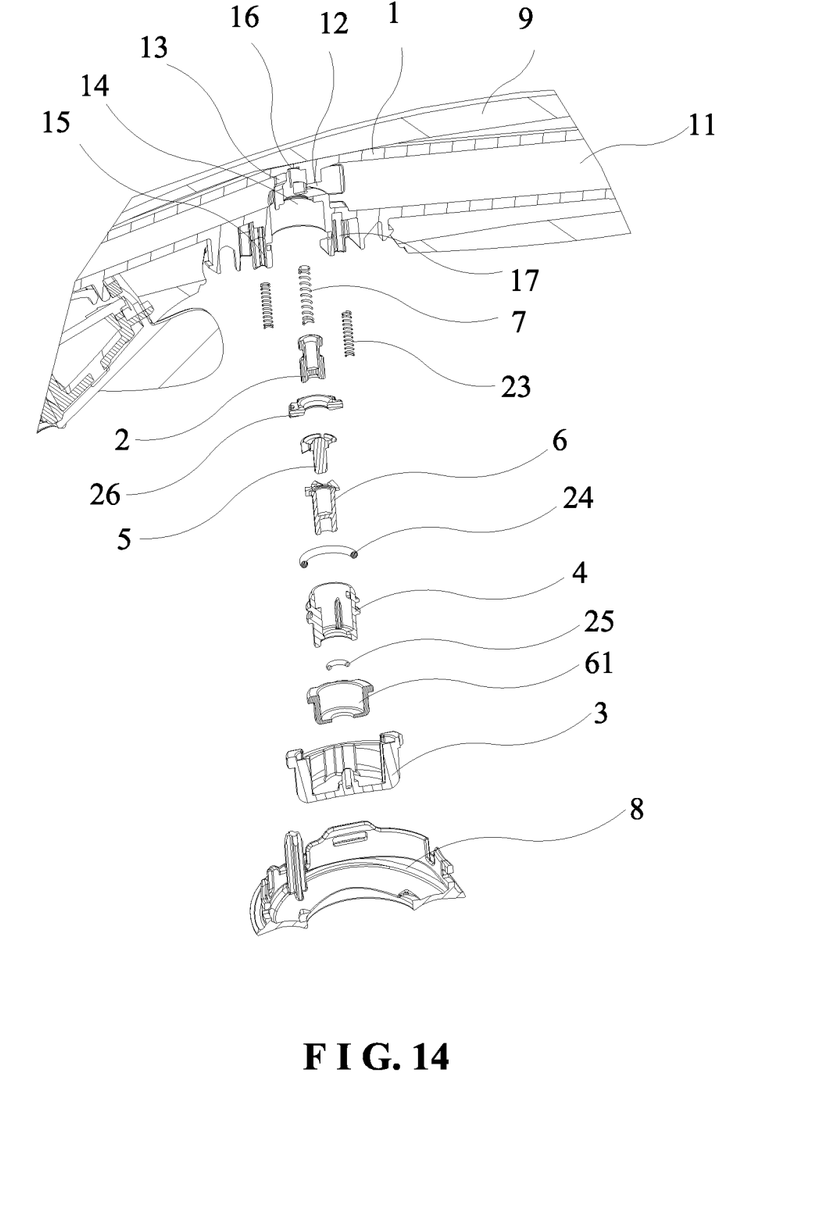
FIG. 14 is an exploded sectional view of the present invention.

In order to improve the airtightness, the push-button water valve further comprises a first O-shaped sealing ring 24 and a second O-shaped sealing ring 25. The first O-shaped sealing ring 24 is disposed between the fixing seat 4 and the core chamber 14. The second O-shaped sealing ring 25 is disposed between the connecting shaft sleeve 6 and the fixing seat 4. The gasket 26 is disposed at the bottom of the core chamber 14. As shown in FIG. 13, the gasket 26 has a gear-like shape, which can prevent it from turning.

The water inlet assembly 1 of the foregoing embodiment uses a water inlet pipe. However, the water inlet assembly 1 of the present invention is not limited thereto. The water inlet assembly 1 may be other components having a water inlet passage according to the actual application requirements.

Based on the above push-button water saving structure, the water saving principle of the button of the present invention is as follows:

When the button 3 is pressed down, the button 3 pushes the valve core 2 to move forward in the core chamber 14 and the valve core spring 7 is compressed. The water inlet hole 12 and the water outlet hole 13 of the peripheral wall of the core chamber 14 (the water chamber 141) are not communicated with each other. The water at one end of the water inlet hole 12 cannot reach the water outlet hole 13 through the water chamber 141. At this moment, the annular groove 21 of the valve core 2 is communicated with the water inlet hole 12 so that the water from the water inlet hole 12 to the valve core 2 is to fill the annular groove 21. The annular groove 21 forms an annular hydraulic chamber. The water pressure in the annular hydraulic chamber is applied towards the axial center of the valve core 2 in 360 degrees so that there is no pressure difference in all directions of the valve core 2. After the button is released, the restoring force of the valve core spring 7 pushes the valve core 2 to move backwards. The friction between the valve core 2 and the peripheral wall of the core chamber 14 is greatly reduced, so that the valve core 2 can be quickly rebounded after the button 3 is released.

Figure 4:
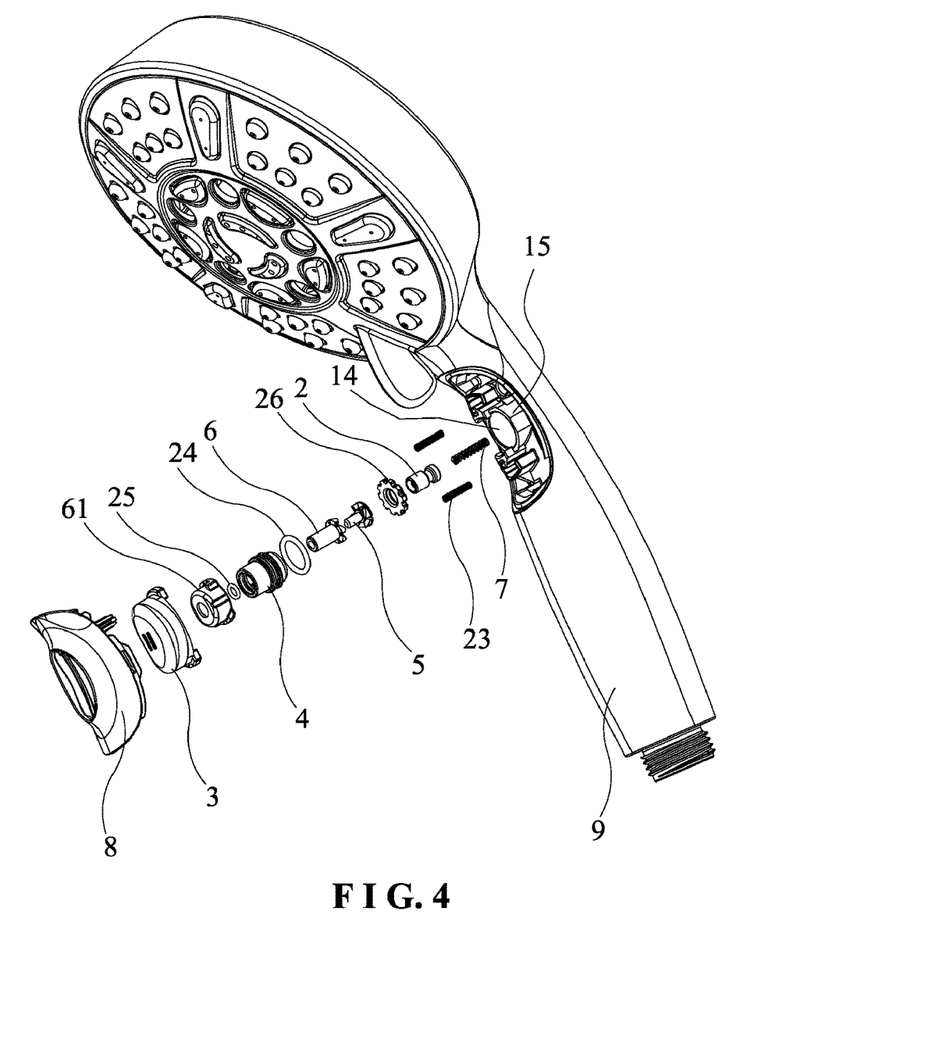
FIG. 4 is an exploded view of the present invention.
Figure 5:
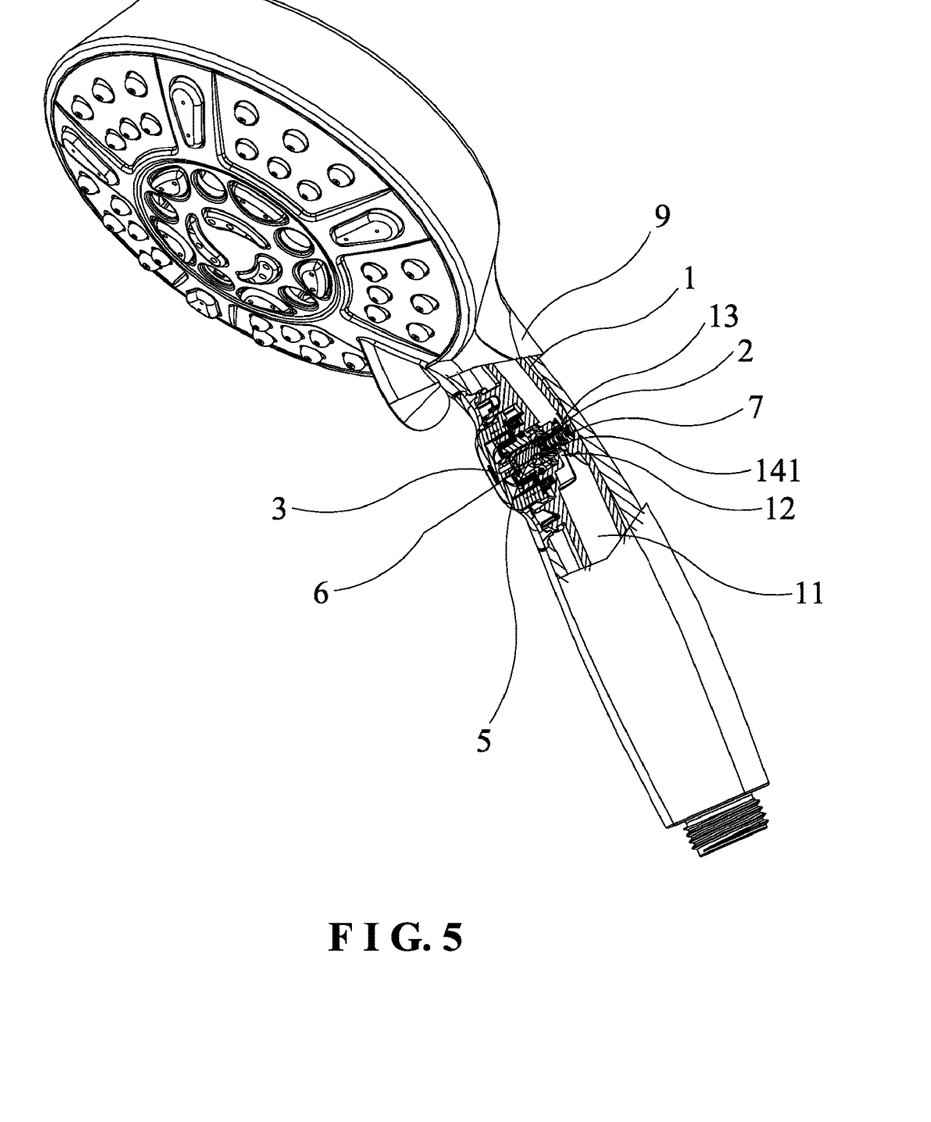
FIG. 5 is a cross-sectional view of the waterway of the present invention in a water saving state.
Figure 6:
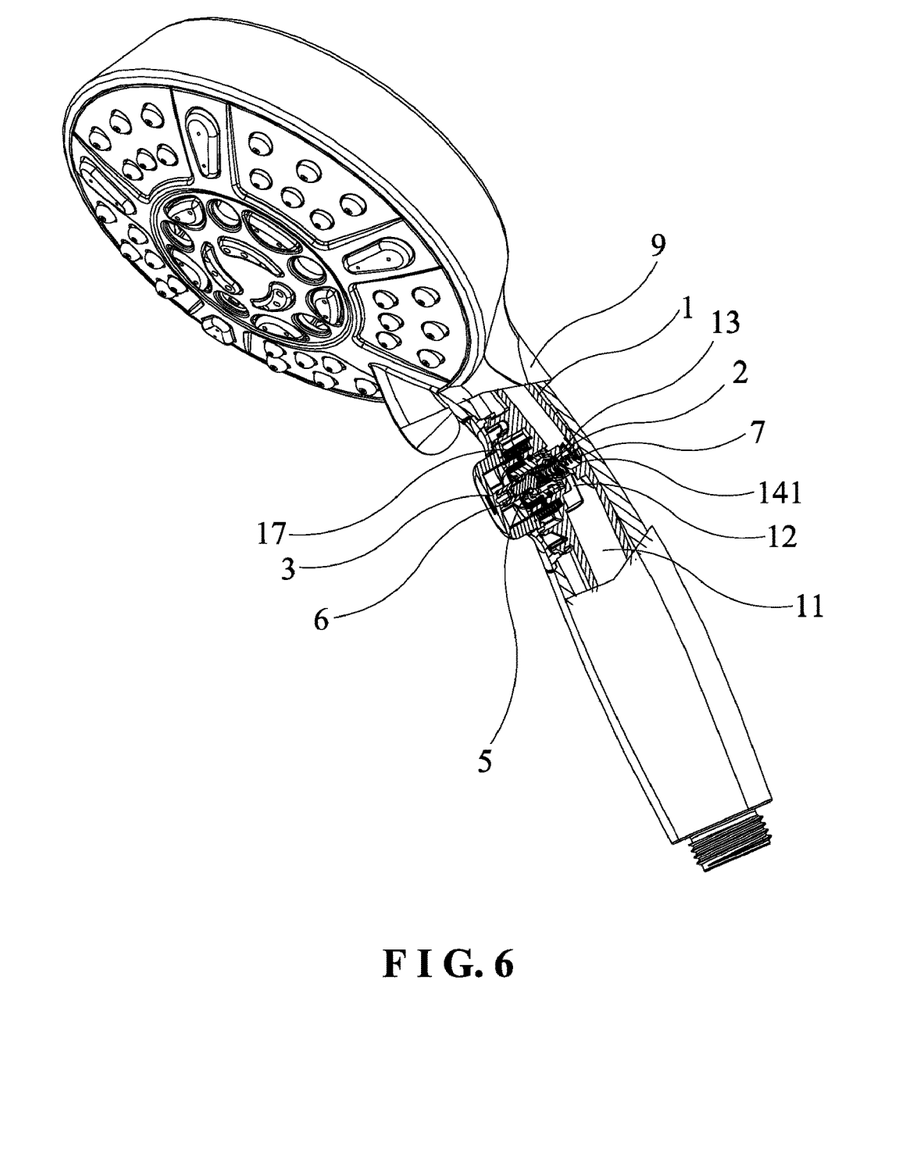
FIG. 6 is a cross-sectional view of the waterway of the present invention not in a water saving state.
Figure 7:
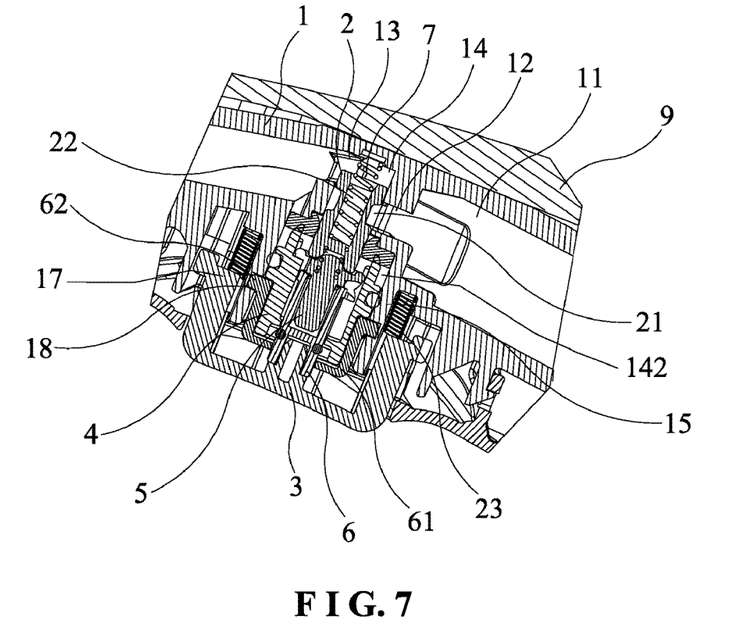
FIG. 7 and FIG. 8 are partial cross-sectional views of the waterway of the present invention in a water saving state.
Figure 8:
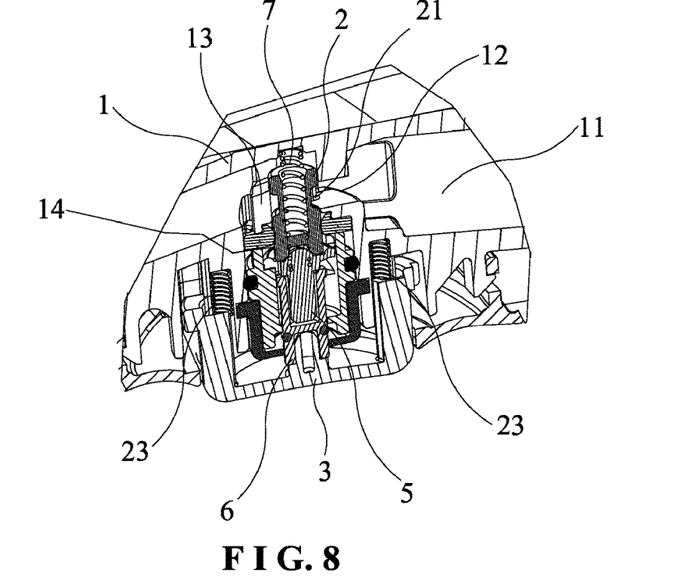
Figure 9:
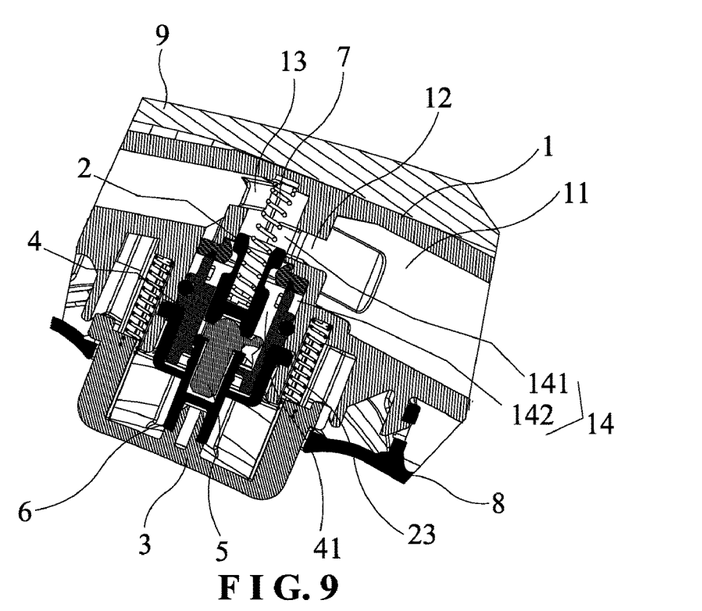
FIG. 9 and FIG. 10 are partial cross-sectional views of the waterway of the present invention not in a water saving state.
Figure 10:
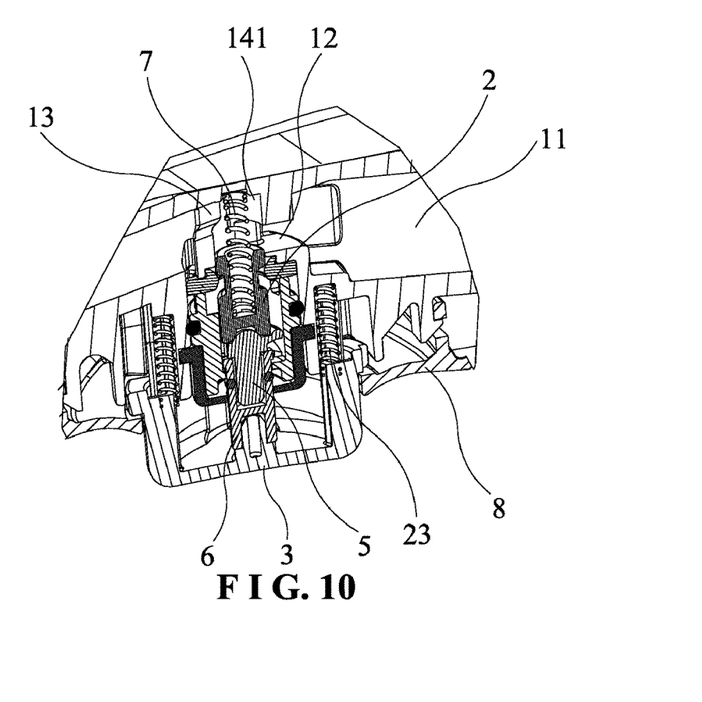
Figure 11:
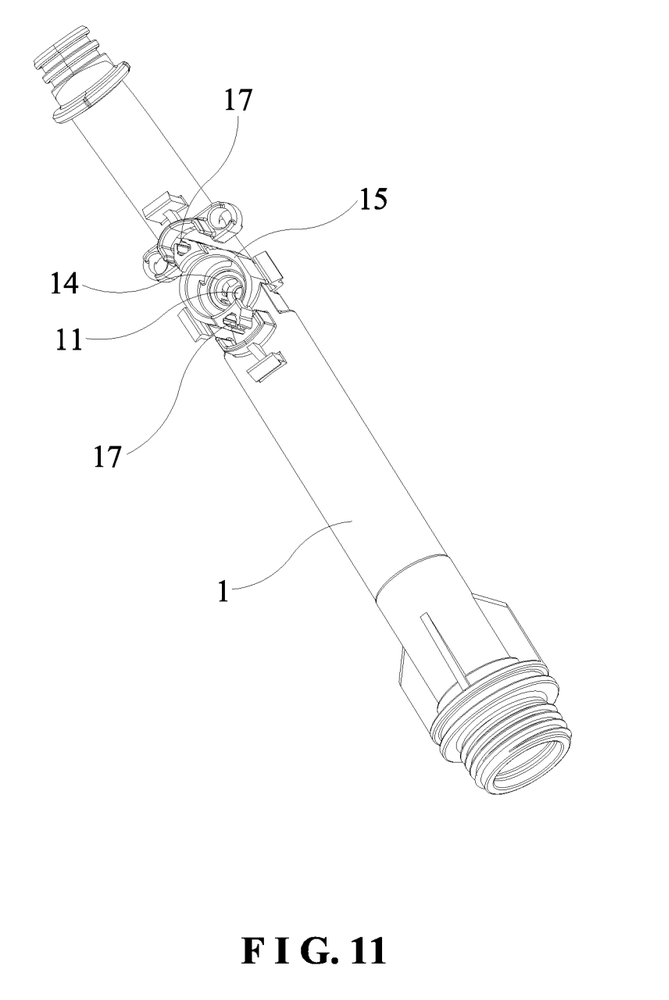
FIG. 11 is a structural schematic view of the water inlet assembly of the present invention.
Figure 12:
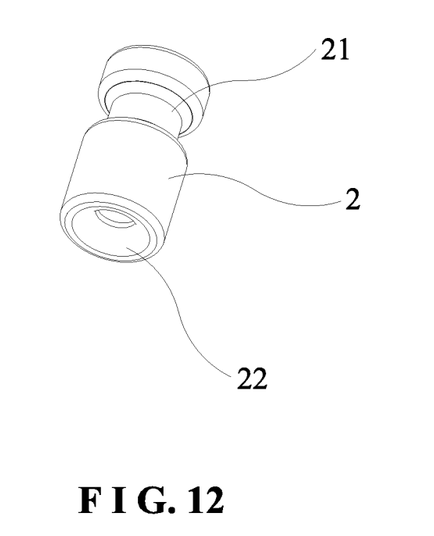
FIG. 12 is a structural schematic view of the valve core of the present invention.

Referring to FIG. 4 to FIG. 6, the present invention is applied to a shower head. The water inlet assembly 1 is disposed in a shower head casing 9. The shower head is a common application of the push-button water saving structure. By improving the push-button water saving structure, the present invention provides a labor-saving water valve to meet the water saving needs of the shower head. The present invention also solves the problem that the button of the conventional shower head is not easy to rebound and the waterway may be blocked after the push-button water saving structure of the shower head is used for a long time.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A labor-saving push-button water valve, comprising a button, a valve core, a valve core spring and a valve seat, a middle portion of the valve seat being formed with a core chamber, a peripheral wall of the core chamber being provided with a water inlet hole and a water outlet hole, the valve core being movably inserted in the core chamber to move back and forth, a front end of the valve core leaning against the valve core spring, a rear end of the valve core being connected to the button, the valve core being driven by the button and the valve core spring to move back and forth in the core chamber so that the water inlet hole is communicated with the water outlet hole to open the water valve or the water inlet hole is not communicated with the water outlet hole to close the water valve; characterized in that an outer periphery of the front end of the valve core is formed with an annular groove, when the button drives the valve core to move to the position where the water inlet hole is not communicated with the water outlet hole, the annular groove of the valve core is communicated with the water inlet hole, and an annular hydraulic chamber is formed between the valve core and the peripheral wall of the core chamber;

wherein the valve seat is formed on a side wall of a water inlet assembly, the water inlet assembly is formed with a water inlet passage in the water inlet assembly, the core chamber is divided into a front section and a rear section to communicate with each other, the front section is a water chamber extending from the side wall of the water inlet assembly to the water inlet passage, the rear section is a drive chamber extending to an outside of the water inlet assembly, the valve core is movably inserted in the water chamber and the drive chamber to move back and forth, the front end of the valve core is moved back and forth in the water chamber for the water inlet hole and the water outlet hole to be connected or disconnected, the rear end of the valve core is moved back and forth in the drive chamber; a gasket is provided between the water chamber and the drive chamber, the gasket is sleeved on the valve core; a peripheral wall of the water chamber is formed with the water inlet hole and the water outlet hole, the water inlet hole is communicated with a water inlet end of the water inlet passage, the water outlet hole is communicated with a water outlet end of the water inlet passage;

the labor-saving push-button water valve further comprises a fixing seat, a connecting shaft and a connecting shaft sleeve, the fixing seat is disposed in the drive chamber, the fixing seat is provided with a through hole, the rear end of the valve core is movably inserted in through hole, the rear end of the valve core is connected to a front end of the connecting shaft which is movably disposed in the through hole of the fixing seat, a rear end of the connecting shaft is connected to a front end of the connecting shaft sleeve which is movably disposed in the through hole of the fixing seat; two sides of the valve seat are formed with slide grooves respectively, return springs are provided in the slide grooves respectively, two sides of the button are movably disposed in the slide grooves to be moved axially in the slide grooves, when the button is moved axially, a central portion of the button is fitted on a rear end of the connecting shaft sleeve to push the connecting shaft sleeve, the connecting shaft and the valve core to move axially simultaneously.

2. The labor-saving push-button water valve as claimed in claim 1, wherein the water inlet hole and the water outlet hole of the peripheral wall of the core chamber are staggered with each other.

3. The labor-saving push-button water valve as claimed in claim 1, wherein an inner wall of the water inlet assembly is formed with a fixing groove, and a front end of the valve core spring is fixed in the fixing groove.

4. The labor-saving push-button water valve as claimed in claim 1, further comprising a decorative cover buckled on a side of the water inlet assembly, the decorative cover being configured to retain the button so that the button won't disengage from the slide grooves.

5. The labor-saving push-button water valve as claimed in claim 1, further comprising a retainer, an inner wall of the drive chamber being formed with an engaging groove, a bottom of the retainer extending laterally to form an engaging ring, the engaging ring being engaged in the engaging groove, a top of the retainer being sleeved on an upper end of the fixing seat so that the fixing seat won't disengage from the drive chamber.

6. The labor-saving push-button water valve as claimed in claim 1, further comprising a first O-shaped sealing ring and a second O-shaped sealing ring, the first O-shaped sealing ring being disposed between the fixing seat and the drive chamber, the second O-shaped sealing ring being disposed between the connecting shaft sleeve and the fixing seat.

7. The labor-saving push-button water valve as claimed in claim 1, wherein the valve core is formed with a positioning hole in an axial direction, and a rear end of the valve core spring is inserted and engaged in the positioning hole.

8. The labor-saving push-button water valve as claimed in claim 1, wherein the water inlet assembly is a water inlet pipe.

* * * * *